United States Patent [19]
Ziolkowski et al.

[11] Patent Number: 5,027,644
[45] Date of Patent: Jul. 2, 1991

[54] METHOD AND APPARATUS FOR INJECTING ACOUSTIC SIGNALS INTO LIVE GAS MAINS

[75] Inventors: Christopher J. Ziolkowski, Chicago; James E. Huebler, Brookfield, both of Ill.

[73] Assignee: Institute of Gas Technology, Chicago, Ill.

[21] Appl. No.: 491,296

[22] Filed: Mar. 9, 1990

[51] Int. Cl.[5] ............................................. G01M 3/24
[52] U.S. Cl. ................................. 73/40.5 A; 73/592; 137/505.37
[58] Field of Search ................. 73/40.5 A, 592, 584, 73/597; 137/505, 505.36, 505.37; 48/191

[56] References Cited

U.S. PATENT DOCUMENTS

| | | | |
|---|---|---|---|
| 3,055,209 | 9/1962 | Reid et al. | 73/592 |
| 3,170,152 | 2/1965 | Long | 73/40.5 A |
| 3,264,864 | 8/1966 | Reid et al. | 73/592 |
| 3,967,282 | 6/1976 | Young et al. | 342/22 |
| 4,013,905 | 3/1977 | Breneman et al. | 310/336 |
| 4,062,010 | 12/1977 | Young et al. | 342/21 |
| 4,172,382 | 10/1979 | Murphy et al. | 73/40.5 A |
| 4,600,356 | 7/1986 | Bridges et al. | 414/694 |
| 4,649,948 | 3/1987 | Hudson | 73/40.5 A X |
| 4,782,702 | 11/1988 | Boone et al. | 73/597 |
| 4,911,012 | 3/1990 | Ziska | 73/584 |
| 4,920,802 | 5/1990 | McMullin et al. | 73/597 |

FOREIGN PATENT DOCUMENTS

| | | | |
|---|---|---|---|
| 66128 | 4/1985 | Japan | 73/40.5 A |
| 238733 | 11/1985 | Japan | 73/592 |
| 238734 | 11/1985 | Japan | 73/592 |
| 1023289 | 6/1983 | U.S.S.R. | 137/505 |

*Primary Examiner*—Hezron E. Williams
*Assistant Examiner*—Joseph W. Roskos
*Attorney, Agent, or Firm*—Thomas W. Speckman; Douglas H. Pauley

[57] ABSTRACT

A method and apparatus for generating and introducing an acoustic signal into a piping system, such as a natural gas distribution system. A first case is sealably secured to a second case to form a diaphragm case. A diaphragm is sealably positioned within the diaphragm case between the first case and the second case. The first case and the diaphragm define a first chamber and the second case and the diaphragm define a second chamber. The first chamber is preferably in communication with the ambient atmosphere and operates at atmospheric pressure. The diaphragm case is one component of a pressure regulator that has an inlet and an outlet for connecting the pressure regulator within a piping system. The pressure regulator regulates fluid pressure within the piping system, downstream from the pressure regulator. The pressure regulator has a valve plug and a valve stem connected to the valve plug. An opposite end of the valve stem is connected to the diaphragm. An acoustic signal is introduced into the first chamber in order to vibrate the diaphragm and produce an acoustic signal, preferably amplified, within the piping system, downstream from the pressure regulator.

20 Claims, 1 Drawing Sheet

METHOD AND APPARATUS FOR INJECTING ACOUSTIC SIGNALS INTO LIVE GAS MAINS

BACKGROUND OF THE INVENTION

1. Field of the Invention

This invention relates to a method and apparatus for generating and introducing acoustic signals into a low pressure chamber of a pressure regulator or governor mounted within a piping system, without breaching the piping system or interrupting flow through the piping system.

2. Description of the Prior Art

U.S. Pat. No. 3,055,209 discloses a method and apparatus for locating gas leaks in underground pipes. A speaker is positioned at one end of a branch pipe, which is in direct communication with a main pipe. A transducer is used to pick up sound waves emitted by the speaker and an amplifier and an indicator are used to detect the location of a pipe or a pipe leak by measuring the sound intensity from ground level. A disadvantage of the teachings of the '209 patent is the need for direct communication between the branch pipe and the main pipe, thus requiring shutdown of the main pipe to safely connect the speaker. Such method creates environmental, health and safety hazards.

U.S. Pat. No. 3,170,152 discloses an apparatus for detecting leaks in underground piping systems. A probe is inserted into an excavated hole to establish contact with a pipe. A transducer is positioned on one end of the probe and the probe is moved about various locations along the pipeline until a signal other than ambient noise is detected.

U.S. Pat. No. 3,264,864 discloses a process and apparatus for detecting gas leaks in underground pipes. A transmitting station is used to introduce sonic frequency signals into a main gas conduit, through a branch pipe which operates at the same pressure as the main line. The transmitted signals are detected at a portable transducer which is located at a receiving station that is coupled to the earth's surface, at different locations. The sonic pressure wave generated in the gas line results in the transmission of a mechanically excited sonic wave which escapes through a leak in the pipeline, into the earth. Such sonic wave can be detected by the transducer.

U.S. Pat. No. 4,013,905 discloses an apparatus for receiving acoustic signals from an underground pipe. The acoustic signals are transformed into electrical voltages which are fed into a computer. U.S. Pat. No. 4,172,382 discloses a laser interferometer system for detecting leaks and corrosion in underground pipelines, pressure containers and other metallic structures.

U.S. Pat. Nos. 3,967,282 and 4,062,010 disclose processes and apparatuses for detecting underground pipelines with an electrical impulse source which transmits a radar-type signal through an antenna into the ground. The radar-type signal is then reflected by a target. U.S. Pat. No. 4,600,356 discloses a process and apparatus combined with an excavation device for alerting an operator of an underground obstruction, particularly an elongated conductive object, such as water pipes and electrical cables. U.S. Pat. No. 4,649,948 discloses an apparatus and process for installing a Wye device within a pressurized pipe. The device includes a system for inserting a probe into a pressurized pipe for detecting leaks within the pipe.

SUMMARY OF THE INVENTION

It is an object of this invention to generate an acoustic signal and introduce the acoustic signal into an atmospheric chamber of a pressure regulator mounted within a piping system, without interrupting flow through the piping system.

It is another object of this invention to vibrate a diaphragm within the pressure regulator, with the acoustic signal generated in the atmospheric chamber.

It is another object of this invention to amplify the magnitude of the acoustic signal and produce a frequency, preferably a natural resonant frequency, within the piping system downstream from the pressure regulator.

It is still another object of this invention to generate the acoustic signal into the atmospheric chamber of the pressure regulator mounted within the live piping system, without requiring excavation around a tie-in point of the piping system and without hot-tapping into the piping system.

These and other objects and advantages of this invention are achieved with a pressure regulator or governor having a diaphragm case including a first case sealably secured to a second case. The first case defines a first chamber, which preferably operates at atmospheric pressure, and the second case defines a second chamber, which operates at a higher pressure than the pressure of the first chamber. A diaphragm is sealably positioned between the first case and the second case. The diaphragm isolates the first chamber from the second chamber.

The first chamber is preferably in communication with the ambient atmosphere. It is apparent that the first chamber can operate at pressure other than atmospheric pressure of the ambient air. In one embodiment of this invention, a vent conduit forms communication between the first chamber and the ambient atmosphere. One end of the vent conduit is sealably secured to the first case about a through hole within the first case. The other end of the vent conduit is exposed to the ambient atmosphere. Application of the method and apparatus of this invention is particularly suitable when the diaphragm case is underground or otherwise inaccessible.

An inlet conduit secured to the valve body of the pressure regulator or governor is used to introduce gas into the second chamber and an outlet conduit secured to the valve body of the pressure regulator or governor is used to discharge the gas from the second chamber. The pressure regulator or governor which regulates gas pressure is mounted within the piping system. A valve stem is connected between and to a valve plug and the diaphragm. According to one preferred embodiment of this invention, a spring force applied to the diaphragm is used to control the valve plug and thus regulate the downstream pressure of the piping system. One end of a spring is secured to the diaphragm and the opposite end is fixed with respect to the diaphragm case. In one preferred embodiment, the spring is an adjustable coil spring. In another preferred embodiment, in lieu of the spring, a dead weight is fixed to the diaphragm in order to apply a gravitational force, which is equal to the spring force, on the diaphragm.

An acoustic signal is introduced into the first chamber, preferably through an existing or installed vent conduit. The acoustic signal is a pressure wave that vibrates the diaphragm and thus the valve plug, both at the same frequency. According to one embodiment of this invention, an acoustic loudspeaker generates the acoustic signal. The frequency and the amplitude of the acoustic signal is regulated by a control device. According to one embodiment of this invention, downstream from the pressure regulator, the vibrations in the piping system are monitored by a feedback transducer or pickup. The feedback transducer is electrically coupled to the control device and emits a signal which is received by the control device. The control device uses such feedback signal to calculate the natural resonant frequency of the system and drive the acoustic loudspeaker at such frequency.

This invention is particularly useful for generating the acoustic signal into the pressure regulator of the piping system to locate leaks within the piping system. The acoustic signal may also be generated into the piping system to locate components and branches of the piping system downstream, and possibly upstream, from the pressure regulator. This invention is particularly beneficial when used with underground non-metallic piping systems, such as polymeric piping systems which are difficult to locate with conventional apparatuses or by conventional processes. The acoustic signals generated by this invention may also be used for data communication to locations on the piping system. It is an important feature of this invention to be able to generate the acoustic signal directly into an existing vent of the pressure regulator or governor, which is mounted within a live piping system. Thus, this invention eliminates the need for excavation around a tie-in point of the piping system, as required with conventional apparatuses. This invention also eliminates the need for hot-tapping into a pressurized piping system. Hence, no fluid escapes from the piping system into the environment and thus this invention virtually eliminates health and safety hazards.

BRIEF DESCRIPTION OF THE DRAWINGS

Further features of this invention will be apparent from the following more detailed description taken in conjunction with the drawings, wherein.

DESCRIPTION OF THE PREFERRED EMBODIMENTS

According to this invention, an acoustic signal in the form of an oscillating pressure wave is injected directly into the stream of fluid flow, preferably into natural gas. The method and apparatus of this invention utilize an existing pressure regulator or governor found on most natural gas distribution systems. Throughout this specification and the claims, the term "pressure regulator" is intended to relate to either a pressure regulator, a governor or another similar pressure regulating device. A pressure regulator is primarily used to regulate pressure within a branch line, of a natural gas distribution system, which operates at a lower pressure than the main line. A governor is primarily used to regulate pressure within a district or main gas line. Such pressure regulators normally require a vent to the atmosphere. In natural gas distribution systems where the pressure regulator is buried underground, the vent to the atmosphere usually is accomplished with a vent conduit routed from the pressure regulator to an above ground location.

Figure 1:
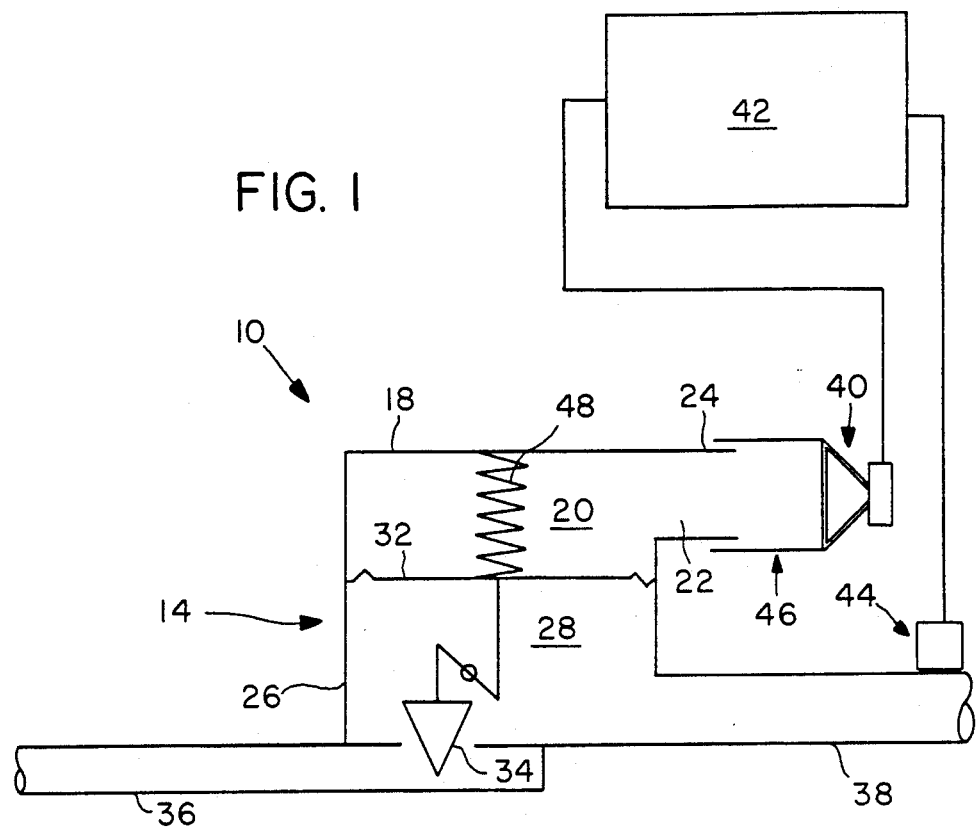
FIG. 1 is a diagrammatic view of one preferred embodiment of an apparatus of this invention.
Figure 2:
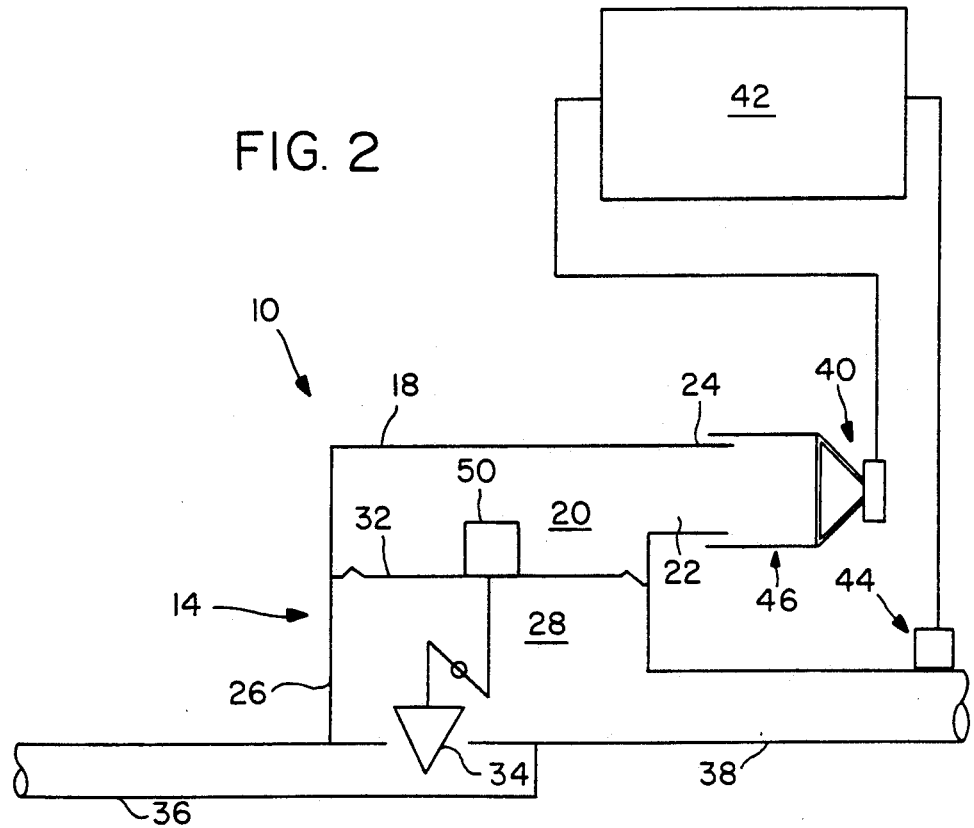
FIG. 2 is a diagrammatic view of another preferred embodiment of an apparatus having a dead weight, in lieu of a spring, attached to the diaphragm.

By driving a pressure regulator with an acoustic signal at a frequency corresponding to the mechanical resonant frequency of the pressure regulator, the efficiency of the signal produced downstream within the piping system will be greatly increased. Driving the piping system at a mechanical resonant frequency can also result in a significant amplification of the acoustic signal, downstream within the piping system. FIGS. 1 and 2 show two different preferred embodiments of an apparatus according to this invention. Diaphragm case 14 comprises first case 18 sealably secured to second case 26. In one preferred embodiment according to this invention, the pressure regulator is installed in an underground piping system. In such embodiment, diaphragm case 14 is in communication with the ambient atmosphere.

Diaphragm 32 is positioned between first case 18 and second case 26. Diaphragm 32 separates first case 18 and second case 26 into two independent pressure chambers.

First case 18 and diaphragm 32 define first chamber 20. Second case 26 and diaphragm 32 define second chamber 28. Diaphragm 32 may comprise any thin, flexible membrane which conforms to the overall shape of the connection between first case 18 and second case 26. Suitable diaphragm designs are apparent to those skilled in the art. In one preferred embodiment according to this invention, first chamber 20 is in communication with the surrounding ambient atmosphere and thus operates at atmospheric pressure. However, it is apparent that first chamber 20 can also operate at a pressure other than atmospheric pressure. Second chamber 28 preferably operates at a pressure greater than the pressure of first chamber 20.

Vent means are used to form the communication between first chamber 20 and the ambient atmosphere. As shown in FIGS. 1 and 2, the vent means comprise vent conduit 24 having one end sealably secured to first case 18 about through hole 22. Another end of vent conduit 24 is routed aboveground, or in another environment is routed so as to be exposed to the ambient atmosphere. Since FIGS. 1 and 2 represent diagrammatic views, vent conduit 24 is not clearly shown; however, in a typical buried natural gas distribution piping system, vent conduit 24 is between approximately two to four feet in length.

The valve body of the pressure regulator has inlet means which are secured to and in communication with inlet conduit 36 of the piping system. Likewise, the valve body of the pressure regulator has outlet means which are secured to and in communication with discharge conduit 38 of the piping system. According to one preferred embodiment of this invention, as shown in FIGS. 1 and 2, inlet conduit 36 is in communication with second chamber 28. Discharge conduit 38 is also in communication with second chamber 28. Since this invention is particularly suitable for use with natural gas distribution systems, inlet conduit 36 and discharge conduit 38 can represent a main or branch line of a natural gas distribution system.

The pressure regulator, generally shown in FIGS. 1 and 2 as pressure regulating means 10, basically operates by opening and closing valve plug 34. Opening and closing valve plug 34 allows the fluid to flow from inlet conduit 36, through second chamber 28 and into discharge conduit 38 and thus adjusts the pressure within discharge conduit 38. Pressure regulating means 10 generally refers to either a pressure regulator or a governor. Conventional pressure regulators maintain a constant downstream pressure by balancing the force of the gas pressure acting on diaphragm 32 against an adjustable spring or dead weight. Most conventional pressure regulators and governors have a connection for an approximately ¼" to 1" inner diameter of vent conduit 24.

Spring means are secured between and to diaphragm 32 and diaphragm case 14. Spring 48 can be either a tension or compression spring, depending upon whether spring 48 is secured to first case 18 or second case 26. According to one preferred embodiment of this invention, as shown in FIG. 1, spring 48 is secured to diaphragm 32 and first case 18. Spring 48 can also be an adjustable coil spring. FIG. 2 shows another preferred embodiment according to this invention wherein the spring means comprises dead weight 50 secured directly to diaphragm 32. It is apparent that dead weight 50 can be secured to either the upper or lower portion of diaphragm 32.

Acoustic signal means are used to introduce the acoustic signal into first chamber 20 in order to generate a pressure wave that vibrates diaphragm 32 and thus valve plug 34. In one preferred embodiment according to this invention, the acoustic signal means comprises speaker means 40. Speaker means 40 can include any type of acoustical loudspeaker with appropriate driving electronics. For example, the acoustical speaker can have a diameter of approximately 6" to 10", and since vent conduit 24 preferably has an inner diameter of approximately ¼" to 1", a gradual reducer from the 6" to 10" loudspeaker down to the ¼" to 1" fitting is preferred. Speaker means 40 introduces pressure fluctuations or vibrations into first chamber 20. Such pressure fluctuations or vibrations then vibrate diaphragm 32 and cause a pressure fluctuation or vibration through the fluid within discharge conduit 38, at the same frequency as the input signal from speaker mean 40.

According to one preferred embodiment of this invention, the driving electronics include control means 42 which regulates the frequency and amplitude of the acoustic signal. As shown in FIGS. 1 and 2, feedback transducer or pickup means 44 monitors the vibrations or pressure fluctuations within the piping system, downstream from the pressure regulator. Feedback transducer or pickup means 44 is electronically coupled to control means 42. Feedback transducer or pickup means 44 may include any suitable receiver, including a transducer capable of sensing sound waves or pressure fluctuations, a frequency selective amplifying means and an indicator. Feedback transducer or pickup means 44 may comprise either electrical or acoustical types of sensors, both of which are well known in the art. Feedback transducer or pickup means 44 is an important aspect of this invention since it can be used in conjunction with control means 42 to derive an input acoustic signal which represents the mechanical resonant frequency of the regulator and piping system. By achieving such mechanical resonant frequency, the acoustic signal downstream from the pressure regulator can be greatly amplified. Such amplification is obviously advantageous for detecting leaks within piping systems or detecting the location of certain pipes or conduits within the piping system or for communicating data to receivers within the piping system.

Amplified acoustic signals or pressure waves within the piping system or natural gas distribution system will enhance the ability to detect the location of pipes, particularly in relatively new installations which use plastic or other polymeric piping systems. Such plastic or polymeric piping systems are not amenable to various conventional electromagnetic pipe locating systems.

In one preferred embodiment according to this invention, adapter means 46, as shown in FIGS. 1 and 2, is secured to speaker means 40. Adapter means 46 may enhance projection of the acoustic signal into the vent means. Such adapter means 46 can comprise a pipe coupling or any other suitable adapter known to those skilled in the art. Adapter means 46 preferably includes a gradual reduction from speaker means 40 to vent conduit 24.

By generating and introducing the acoustic signal directly into an existing vent conduit 24, this invention eliminates any excavation necessary to expose the pressure regulator. Furthermore, according to this invention, there is no need to hot-tap into the pressurized piping system or natural gas distribution system, in order to introduce the acoustic signal into the piping system. Also, the piping system or natural gas distribution system does not have to be shutdown in order to introduce the acoustic signal.

In another embodiment according to this invention, the step of introducing the acoustic signal into the low pressure or atmospheric chamber of the pressure regulator can be replaced with mechanically vibrating the valve body of the pressure regulator. The valve body can be mechanically vibrated by contacting a mechanical vibrating means either directly to the valve body, to vent conduit 24 or to another suitable mechanical component of or near the pressure regulator. In such embodiment, the mechanical vibration is transmitted through the mechanical components of the pressure regulator, including diaphragm 32. The vibration of diaphragm 32 will open and close valve plug 34 much in the same manner as described in the above specification. Control means 42 can be used along with feedback transducer or pickup means 42 to maintain the pressure fluctuations within the piping system at a natural resonant frequency. Thus, mechanical vibrating means can be used to accomplish the same results as introducing an acoustic signal into first chamber 20. However, the acoustic signal method and apparatus of this invention may be more effective and practical when dealing with underground or inaccessible piping systems.

While in the foregoing specification this invention has been described in relation to certain preferred embodiments thereof, and many details have been set forth for purpose of illustration, it will be apparent to those skilled in the art that this invention is susceptible to additional embodiments and that certain of the details described herein can be varied considerably without departing from the basic principles of the invention.

We claim:

1. An apparatus for introducing an acoustic signal into a piping system, the apparatus comprising:
    a first case defining a first chamber, a second case defining a second chamber, said first case sealed with respect to said second case, said first chamber in communication with ambient atmosphere;
    a diaphragm sealably positioned between said first case and said second case;
    inlet means for introducing fluid within said second chamber;
    outlet means for discharging said fluid from said second chamber; and
    pressure regulating means for regulating fluid pressure in the piping system downstream from said pressure regulating means, said pressure regulating means comprising a seated valve plug and a valve stem, said valve stem connected between said valve plug and said diaphragm; and acoustic signal means for introducing the acoustic signal within said first chamber in order to vibrate said diaphragm and said pressure regulating means.

2. An apparatus according to claim 1 wherein said first chamber operates at atmospheric pressure and said second chamber operates at a greater pressure than said atmospheric pressure.

3. An apparatus according to claim 1 wherein said first case and said second case are buried underground.

4. An apparatus according to claim 1 wherein said diaphragm sealably isolates said first chamber from said second chamber.

5. An apparatus according to claim 1 further wherein vent means form the communication between said first chamber and said ambient atmosphere.

6. An apparatus according to claim 5 wherein said vent means further comprise a vent conduit, said first case having a through hole, a first end of said vent conduit sealably secured to said first case about said through hole, and a second end of said vent conduit exposed to said ambient atmosphere.

7. An apparatus according to claim 1 wherein said inlet means is secured to and in communication with an inlet conduit secured to said second case and said outlet means is secured to and in communication with a discharge conduit secured to said second case.

8. An apparatus according to claim 1 wherein said pressure regulating means opens and closes said valve plug at a common frequency with said diaphragm permitting said fluid to flow through said pressure regulating means.

9. An apparatus according to claim 1 further comprising spring means for applying a force to said diaphragm, said spring means secured to said diaphragm and fixed with respect to at least one of said first case and said second case.

10. An apparatus according to claim 9 wherein said spring means comprises an adjustable coil spring.

11. An apparatus according to claim 9 wherein said spring means comprises a dead weight secured to said diaphragm in order to apply a gravitational force on said diaphragm.

12. An apparatus according to claim 1 wherein said acoustic signal means further comprises a loudspeaker positioned to generate an acoustic signal within said first case.

13. An apparatus according to claim 12 wherein said loudspeaker is connected to adapter means, said adapter means is connected to one end of a vent conduit, and said vent conduit is in communication with said first chamber.

14. An apparatus according to claim 1 further comprising: said first case having a through hole, a vent conduit sealably secured to said first case about said through hole, and a loudspeaker connected to said vent conduit for generating the acoustic signal into said vent conduit.

15. An apparatus according to claim 1 further comprising control means for regulating at least one of frequency and amplitude of the acoustic signal.

16. An apparatus according to claim 1 further comprising pick-up means for monitoring vibrations in said piping system downstream from said pressure regulating means and said pick-up means electronically coupled to control means for regulating at least one of frequency and amplitude of the acoustic signal.

17. An apparatus according to claim 1 wherein the piping system is of polymeric material.

18. In an apparatus for introducing an acoustic signal into a piping system having a pressure regulator, a diaphragm mounted within a diaphragm case of the pressure regulator thereby defining a first chamber and a second chamber, the first chamber operating at atmospheric pressure, pressure regulating means mounted within the piping system for regulating fluid pressure in the piping system downstream from said pressure regulating means, the improvement comprising:

acoustic signal means for introducing the acoustic signal into the first chamber in order to vibrate said diaphragm and said pressure regulating means.

19. A process for introducing an acoustic signal into a piping system, comprising the steps of:

introducing an acoustic signal into an atmospheric chamber of a pressure regulator; and vibrating a diaphragm mounted within the pressure regulator at a controlled frequency.

20. A process according to claim 19 wherein the diaphragm is vibrated at a mechanical resonant frequency of the piping system.

* * * * *